(12) United States Patent
Shroff

(10) Patent No.: US 12,073,078 B2
(45) Date of Patent: Aug. 27, 2024

(54) SURGE VOLUME MANAGEMENT

(71) Applicant: Bank of America Corporation, Charlotte, NC (US)

(72) Inventor: Bijoy Shroff, Jacksonville, FL (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/831,942

(22) Filed: Jun. 3, 2022

(65) Prior Publication Data

US 2023/0393734 A1 Dec. 7, 2023

(51) Int. Cl.
*G06F 3/06* (2006.01)
*G06F 9/50* (2006.01)

(52) U.S. Cl.
CPC .......... *G06F 3/0604* (2013.01); *G06F 3/0653* (2013.01); *G06F 3/0673* (2013.01); *G06F 9/5016* (2013.01)

(58) Field of Classification Search
CPC ...... G06F 3/0604; G06F 3/061; G06F 3/0611; G06F 3/0613; G06F 3/0631; G06F 3/0635; G06F 3/0653; G06F 3/0673; G06F 3/0683; G06F 9/5016; G06F 11/3034; G06F 11/3037
USPC .................. 710/74; 711/156; 714/47.2, 47.3; 718/104
See application file for complete search history.

(56) References Cited

U.S. PATENT DOCUMENTS

| 8,103,623 B2 | 1/2012 | Lou |
| 11,720,269 B1* | 8/2023 | Baikov ................. G06F 3/0665 711/164 |
| 2008/0144450 A1 | 6/2008 | Chen |
| 2016/0283139 A1* | 9/2016 | Brooker ................ G06F 3/0604 |
| 2017/0123661 A1* | 5/2017 | Chen ..................... G06F 3/0613 |
| 2022/0066822 A1* | 3/2022 | Patel ................... G06F 11/3495 |

* cited by examiner

*Primary Examiner* — Ilwoo Park
(74) *Attorney, Agent, or Firm* — Banner & Witcoff, Ltd.

(57) ABSTRACT

Some aspects as disclosed herein are directed to, for example, a system and method of providing flexible surge volume management to applications when performance capacity is available. The system and method may comprise determining when a data surge is occurring and in response determining available performance capacity and automatically allocating, the available performance capacity, to storage group applications performing data operations.

24 Claims, 4 Drawing Sheets

SURGE VOLUME MANAGEMENT

BACKGROUND

Enterprise organizations often store and utilize vast amounts of data that are stored in different storage platforms. For each storage platform, each user storage group may be given an amount of storage capacity available based on a storage tier assigned to the user storage group. The tier assigned to each user storage group may determine the IOPS (input/output operations per second) for each group. The assigned limits are not flexible and user storage group throughput may be throttled to ensure that the limits are not exceeded. For instance, a user storage group may request a particular storage tier such as a medium storage tier to handle all of their application storage requirements. Based on a medium storage tier designation, the user storage group may be allowed a peak IOPS of less than or equal to 8K. The user storage group may not exceed its given IOPS which may lead to numerous problems for user storage groups not having appropriate limits. In addition, as data continues to grow overtime, surges by individual users or user storage groups of user may become more difficult to handle. In addition, these high demand throughput surges create noise in the system that may affect other user storage groups connected to the storage platform.

A system that eliminates noisy neighbors, prevents slow drain conditions resulting from link utilization, and allows for efficient workload placement is needed. Such a system should be elastic, flexible, and capable of handling the storage needs of critical applications or workloads when performance capacity is available while providing user storage groups consistent response times.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

One or more aspects of the disclosure generally relate to computing devices, computing systems, and computer software. In particular, one or more aspects of the disclosure generally relate to computing devices, computing systems, and computer software that may be used to configure one or more configurable storage limits for applications needing real time additional storage requirements.

Some aspects as disclosed herein are directed to, for example, a system and method of providing flexible surge volume management to applications when performance capacity is available. The system and method may comprise determining when a data surge is occurring and in response determining available performance capacity and automatically allocating, the available performance capacity, to storage group applications performing data operations.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

Figure 1:
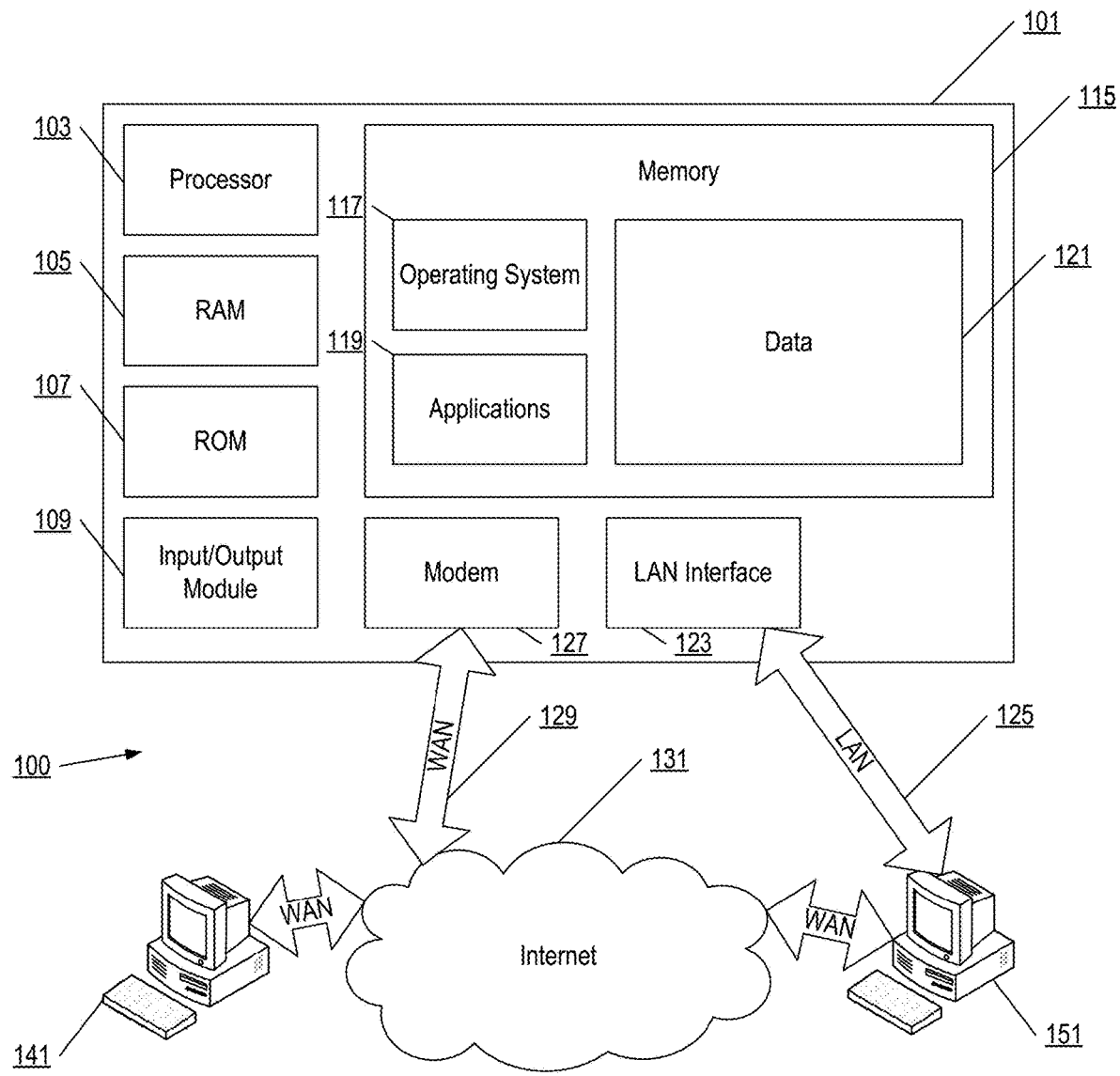
FIG. 1 illustrates an example operating environment in which various aspects of the disclosure may be implemented.

FIG. 1 illustrates an example block diagram of a computing device 101 (e.g., a computer server, desktop computer, laptop computer, tablet computer, other mobile devices, and the like) in an example computing environment 100 that may be used according to one or more illustrative embodiments of the disclosure. The computing device 101 may have a processor 103 for controlling overall operation of the server and its associated components, including for example random access memory (RAM) 105, read-only memory (ROM) 107, input/output (I/O) module 109, and memory 115.

I/O module 109 may include, e.g., a microphone, mouse, keypad, touch screen, scanner, optical reader, and/or stylus (or other input device(s)) through which a user of computing device 101 may provide input, and may also include one or more of a speaker for providing audio output and a video display device for providing textual, audiovisual, and/or graphical output. Software may be stored within memory 115 and/or other storage to provide instructions to processor 103 for enabling computing device 101 to perform various functions. For example, memory 115 may store software used by the computing device 101, such as an operating system 117, application programs 119, and an associated database 121. Additionally or alternatively, some or all of the computer executable instructions for computing device 101 may be embodied in hardware or firmware (not shown).

The computing device 101 may operate in a networked environment supporting connections to one or more remote computers, such as terminals 141 and 151. The terminals 141 and 151 may be personal computers or servers that include any or all of the elements described above with respect to the computing device 101. The network connections depicted in FIG. 1 include a local area network (LAN) 125 and a wide area network (WAN) 129, but may also include other networks. When used in a LAN networking environment, the computing device 101 may be connected to the LAN 125 through a network interface or adapter 123. When used in a WAN networking environment, the computing device 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed. Computing device 101 and/or terminals 141 or 151 may also be mobile terminals (e.g., mobile phones, smartphones, PDAs, notebooks, tablets, and the like) including various other components, such as a battery, speaker, and antennas (not shown).

Figure 2:
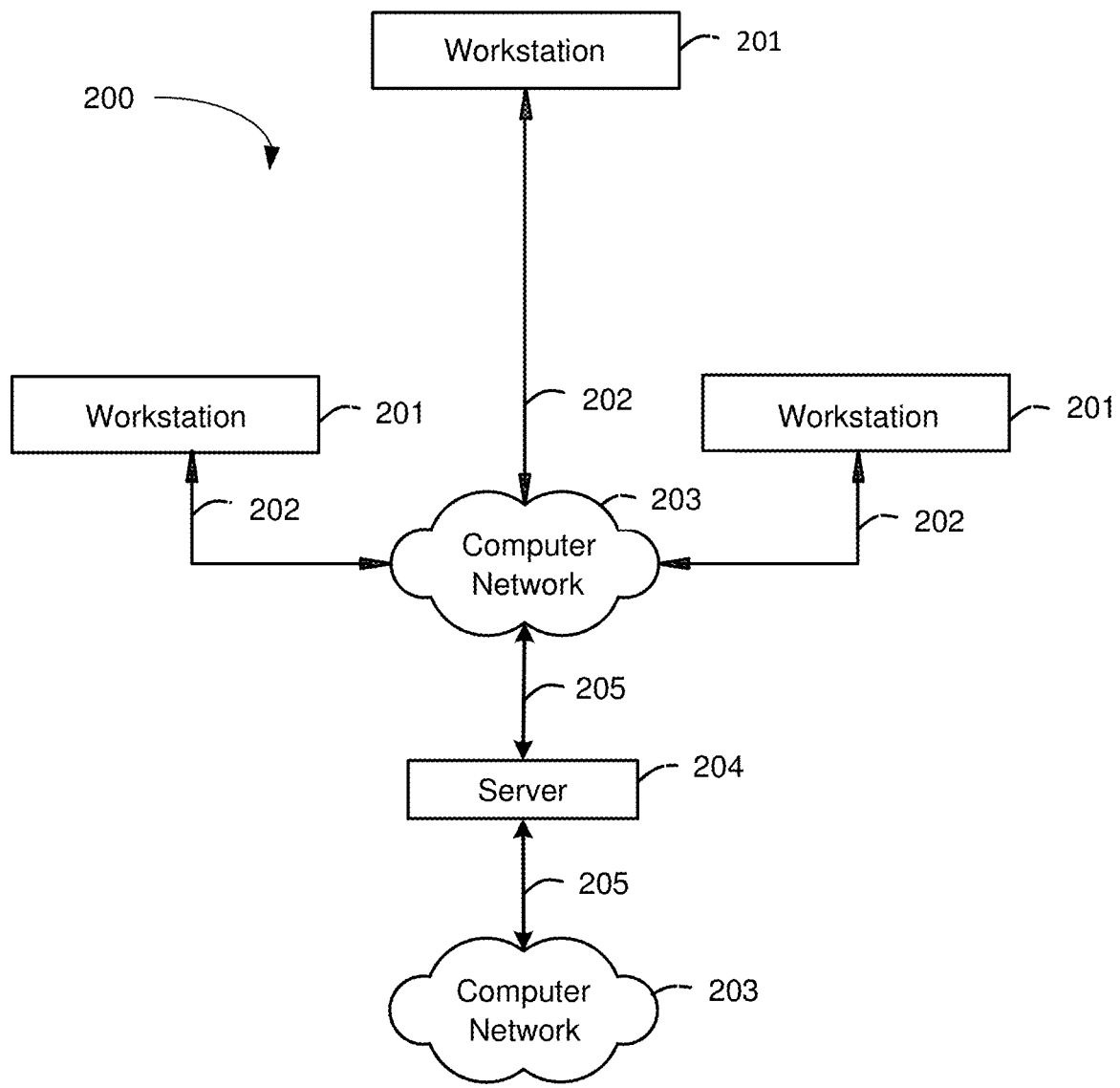
FIG. 2 illustrates another example operating environment in which various aspects of the disclosure may be implemented.

FIG. 2 illustrates another example operating environment in which various aspects of the disclosure may be implemented. An illustrative system 200 for implementing methods according to the present disclosure is shown. As illustrated, system 200 may include one or more workstations 201. The workstations 201 may be used by, for example, agents or other employees of an institution and/or users of the institution. Workstations 201 may be local or remote, and are connected by one or more communications links 202 to computer network 203 that is linked via communications links 205 to server 204. In system 200, server 204 may be any suitable server such as an application server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, and the like.

Figure 3:
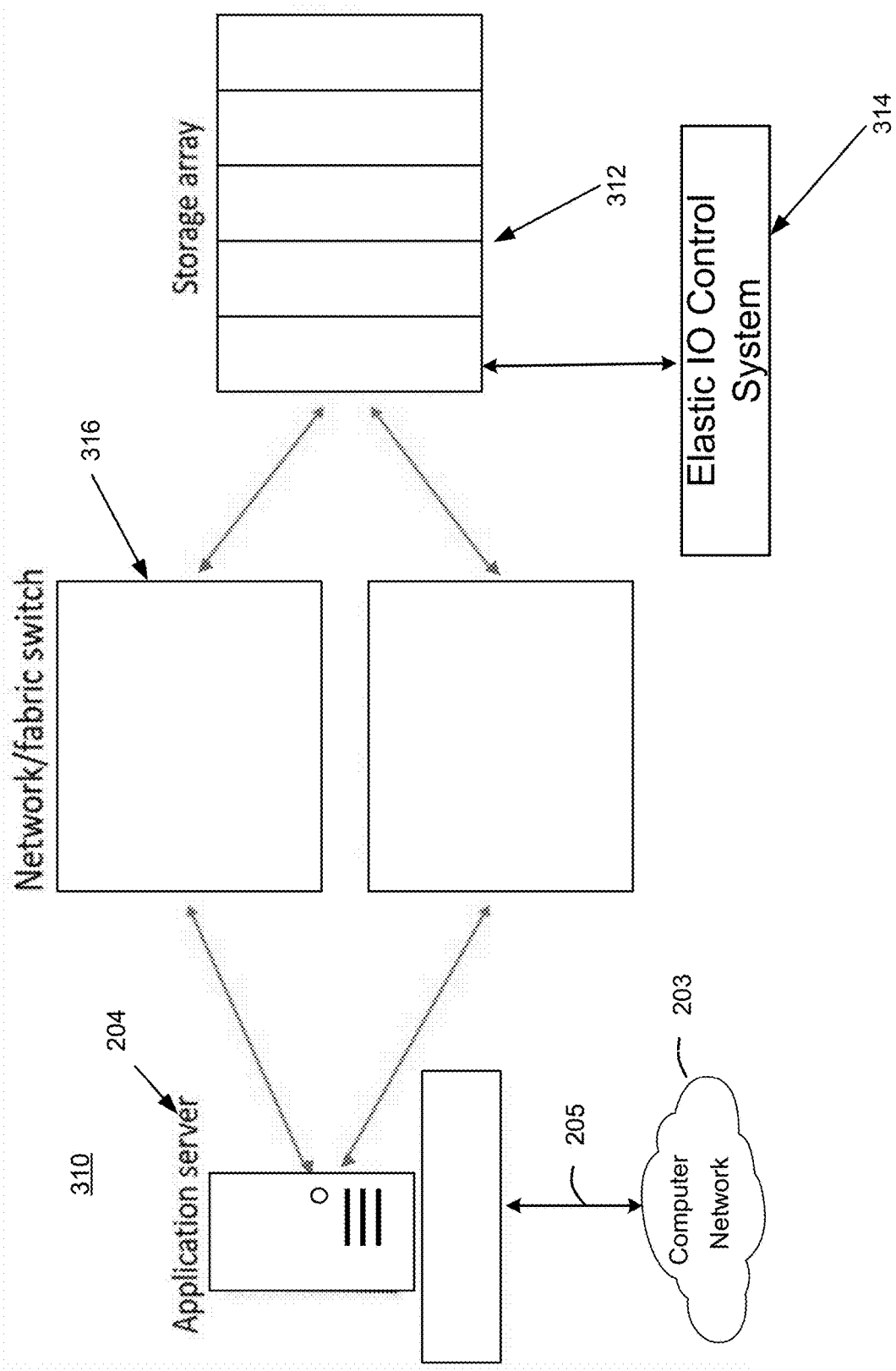
FIG. 3 illustrates yet another another example operating environment in which various aspects of the disclosure may be implemented.

FIG. 3 depicts an illustrative computing environment for implementing surge volume management in accordance with one or more aspects described herein. Referring to FIG. 3, surge management computing platform 310 may include storage array 312, elastic IO (Input/Output) control system 314, and network/fabric switch 316. In an embodiment, network/fabric switch 316 may communicate with application server 204 connected to computer network 203 associated with the enterprise.

In an aspect of the disclosure, surge management computing platform 310 may be configured to perform intelligent, dynamic and efficient data surge functions, as described more fully herein. For instance, surge management computing platform 310 may receive data storage requests from numerous users or user storage groups each requesting different levels of support and requiring different levels of storage resources for their storage needs.

In an aspect of the disclosure, users and/or user storage groups access and store vast amounts of data at various throughputs stored on enterprise data storage devices. For example, numerous users or user storage groups may be trying to simultaneously access or store data such as bulk backups, video files, documents, or other types and forms of data. The simultaneously accessing and/or storing of data by numerous users or user storage groups may put a strain on an enterprise's available bandwidth. This limitation of total bandwidth may result in a noisy neighbor situation where a user performing database bulk copy processes is causing transaction slowness to users preforming application transactions. In an embodiment, elastic IO system 314 provides surge volume management capabilities to distribute performance improvements to consistently handle user storage group storage throughput needs.

In an aspect of the disclosure, elastic IO control system 314 may provide performance capacity to the most critical applications when needed. In an embodiment, each application may be categorized into different tier levels depending upon the criticality of the application or process. For instance, a payroll application may be given a Tier 0 designation identifying the payroll application as a critical enterprise business application. In contrast, a video retrieval application may be give Tier 5 designation identifying it as an application that may not be as critical to the enterprise under normal operations.

In an embodiment, each application may also be given variable tier level designations depending on different definable criteria such as day of week, time of day, specific dates, or different seasons of year. Those skilled in the art will realize that other definable criteria may be utilized such as criteria based on frequency or duration. For instance, a payroll application may be given a Tier 0 designation on the fifteenth and thirtieth of a month and Tier 2 designation on the remaining days of the month. During these specific days of the month, payroll application transactions may be designated as critical to ensure the payroll application it is able to complete is data storage transactions smoothly without any system performance delays.

In another aspect of the disclosure, multiple time bound pre-checks may be performed by elastic IO control system 314 to check the health, availability, and storage capacity of the storage devices along with their available bandwidth capability. The pre-checks may ensure no failures or degraded conditions exist in any IO paths. Any failure of a precheck may prevent the elastic IO control system 314 from performing surge volume management performance improvements.

An additional pre-check may include analyzing applications to determine if the applications are either Tier 0 or Tier 1 applications. For Tier 0 and Tier 1 applications, elastic IO control system 314 may increase system resources for these applications, if needed. In some embodiments, it may be determined that additional resources are available to accommodate additional lower tier ranked applications. In these embodiments, elastic IO control system 314 may automatically accommodate those additional lower ranked tier applications based on available resources.

In an embodiment, elastic IO control system 314 may only be able to adjust or change limits or throughputs during trading hours or regular business hours. In another embodiment, elastic IO control system 314 may not be able to adjust or change limits or throughputs during periods in which no change conditions are instituted. These no change conditions may be implemented during execution of mission critical applications or during periods of important business transactional volumes.

In an embodiment, additional prechecks may include determining that the storage array has available storage capacity to handle increasing application performance capacity and that link utilizations do not exceed guidelines for preventing slow drains. In addition, a precheck may also include determining if the storage array or an associated switch or device such as drives or power supplies has any degraded conditions or failures.

In yet another embodiment, elastic IO control system 314 may precheck that frequent users of the elastic IO control system 314 have been notified and may be removed from utilizing this automation. As those skilled in the art will realize, additional prechecks may be added or existing prechecks removed based on performance criteria or feedback.

Figure 4:
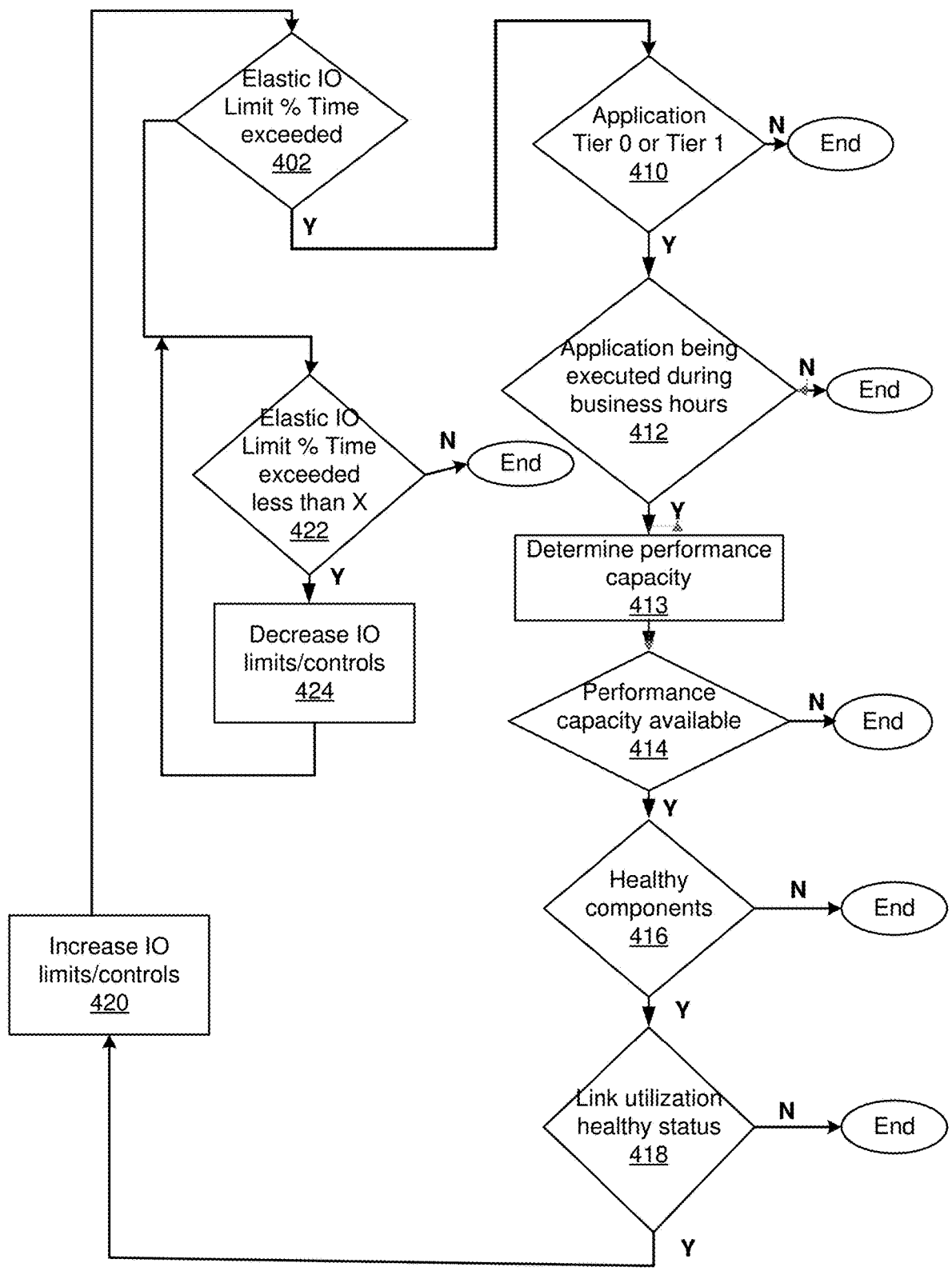
FIG. 4 illustrates an example method for implementing a surge volume management system in which various aspects of the disclosure may be implemented.

FIG. 4 illustrates an example method for implementing surge volume management in accordance with various aspects of the disclosure. In FIG. 4 at step 402, elastic IO control system 314 determines if the metric elastic IO limit % time has been exceeded by a particular user and/or user storage group. In an embodiment, surge management computing platform 310 maintains a database of users and user storage groups and their associated storage limits. These limits include at least limits for TOPS and throughputs for each user and/or user storage group. In an embodiment, at least nightly the user and/or storage groups database is updated with changes to users, user storage groups, or their associated limits. If a user or user storage group has been decommissioned, they will be removed from the database. If in step 402 the elastic IO limit % time has been exceeded, the elastic control IO system 314 determines if the application requesting storage services is a Tier 0 or Tier 1 application. If the application is determined to be a Tier 0 or Tier 1 application then in step 412 the elastic control IO system 314 determines if the application is being executed during business hours. If the application is being executed during business hours the elastic control IO system 314 determines performance capacity of the storage system components to check for additional resources that may be allocated to the application. In an embodiment, if the elastic control IO system 314 determines that the application is not a Tier 0 or Tier 1 application or is not being executed during business hours the surge management process ends.

In an aspect of the disclosure, if the elastic IO limit % time metric has been exceeded for a user storage group it may be increased. The increase may occur if the metric exceeds seventy-five percent of the thresholds agreed to level. Those skilled in the art will realize that the limit may higher or lower based on storage group requirements and historical use of storage system resources.

In step 414, elastic control IO system 314 determines if performance capacity is available. In an embodiment, available performance capacity may include a determination and analysis of many indicators and their results as compared to performance thresholds. Some exemplary indicators that may be used to determine performance capacity include:
  a. Array PercentCacheWP<firstthreshold=45
  b. Array FEPort PercentBusy<firstthreshold=70
  c. Array FEDirector PercentBusy<firstthreshold=50
  d. Array BEDirector PercentBusy<firstthreshold=55
  e. SG MBps Limit<50% of HBA port speed*100
  f. B2B to zero error metric<100K.

Those skilled in the art will realize that additional indicators may be added or removed from the above exemplary listing of performance capacity indicators. In addition, different ranges of threshold values may be used for each indicator depending upon enterprise performance criteria.

If performance capacity is available and in steps 416 and 418 both the storage components and link utilization status are found to be healthy, the elastic control IO system 314 increases the IO limits/controls in step 420 for the user storage group. In an embodiment, if the elastic control IO system 314 determines that there is no performance capacity available or if either of the storage components and link utilization status are found not be healthy the surge management process ends.

In an aspect of the disclosure, user storage groups may have their limits including IOPS and throughput limits increased in increments of twenty-five percent. In an embodiment, if the numbers remain high and the checks all continue to be successful, the IOPS and throughput can be increased another twenty-five percent. In one embodiment, user storage groups may be allowed up to four increases to its limits at which time further increases may not be allowed.

In an embodiment of the disclosure, each time the resources are increased, a notification may be sent to the user storage group responsible parties and storage operation control entities detailing the increase in service. The notification may list all relative data including any new limits.

In an aspect of the disclosure, as shown in step 422 when the Elastic IO Limit % Time exceeded remains less than twenty percent for thirty minutes, then the IOPS and throughput levels may be decreased to the previous level as illustrated in step 424. This may be repeated until the original levels are reached. Any decrease changes should include notifications to the user storage group responsible parties and storage operation control entities.

In an aspect of the disclosure, surge management computing platform 310 may generate daily reports listing all user storage groups with their associated properties for which IO limits/controls have been temporarily increased or decreased. Surge management computing platform 310 may also generate weekly reports for storage performance governance. The weekly report may list the top users or user storage groups broken down by business unit or other identifying criteria. The reports may be used to determine if different service levels should be discussed with business group owners to improve overall efficiency of system. In an embodiment, persistent top users of surge management computing services without changes in service level agreements may be removed from surge management services.

In an embodiment, a dashboard may be generated to display real-time increases or decreases for all users or user storage groups. In an embodiment, specific user storage group may be searched and their status details displayed.

Various aspects described herein may be embodied as a method, an apparatus, or as computer-executable instructions stored on one or more non-transitory and/or tangible computer-readable media. Accordingly, those aspects may take the form of an entirely hardware embodiment, an entirely software embodiment (which may or may not include firmware) stored on one or more non-transitory and/or tangible computer-readable media, or an embodiment combining software and hardware aspects. Any and/or all of the method steps described herein may be embodied in computer-executable instructions stored on a computer-readable medium, such as a non-transitory and/or tangible computer readable medium and/or a computer readable storage medium. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:
1. A method comprising:
  receiving, by a computer platform, the computing platform having at least one processor and memory, first data indicative of a storage performance metric for a user storage group;

comparing, by the at least one processor, the first data indicative of the storage performance metric for the user storage group to at least one threshold value;

determining, by the at least one processor, and based on the comparison of the received first data indicative of the storage performance metric for the user storage group to the at least one threshold value, whether a data surge is occurring;

when it is determined that the data surge is not occurring, continuing to receive, by the computer platform, second data indicative of the storage performance metric for the user storage group;

when it is determined that the data surge is occurring:
   determining available performance capacity of the computer platform; and
   in response to determining that the available performance capacity is available, increasing at least one storage performance metric of the user storage group;

when the storage performance metric remains less than a first predetermined percentage of the at least one threshold value for at least a predetermined time duration, decreasing the at least one threshold value; and when the storage performance metric is greater than a second predetermined percentage of thresholds agreed to level, increasing the at least one threshold value.

2. The method of claim 1, further comprising when it is determined that the data surge is occurring:
   determining if the first data is being executed by a Tier 0 or Tier 1 application; and
   in response to determining that the available performance capacity is available and first data is being executed by the Tier 0 or Tier 1 application, increasing the at least one storage performance metric of the user storage group.

3. The method of claim 2, further comprising when it is determined that the data surge is occurring:
   determining if the first data is being executed during business hours; and
   in response to determining that the available performance capacity is available and the first data is being executed during business hours by the Tier 0 or Tier 1 application, increasing the at least one storage performance metric of the user storage group.

4. The method of claim 2, further comprising when it is determined that the data surge is occurring:
   determining a health status of computer platform components; and
   in response to determining that the available performance capacity is available and the computer platform components are healthy, and the first data is being executed during business hours by the Tier 0 or Tier 1 application, increasing the at least one storage performance metric of the user storage group.

5. The method of claim 2, further comprising when it is determined that the data surge is occurring:
   determining a health status of link utilization; and
   in response to determining that the available performance capacity is available and computer platform components are healthy, a healthy link utilization status, and the first data is being executed during business hours by the Tier 0 or Tier 1 application, increasing the at least one storage performance metric of the user storage group.

6. The method of claim 1, further including generating a notification that the data surge is occurring.

7. The method of claim 1, further comprising:
   generating, for display on a display device, a dashboard showing real-time increases for the performance metrics of the user storage group.

8. The method of claim 1, wherein the at least one storage performance metric of the user storage group includes an IOPS limit.

9. The method of claim 1, wherein the at least one storage performance metric of the user storage group includes a throughput limit.

10. The method of claim 1, wherein the at least one storage performance metric of the user storage group includes both an IOPS limit and a throughput limit.

11. An apparatus, comprising:
   a processor; and
   memory storing computer-executable instructions that, when executed by the processor, cause the apparatus to:
      receive first data indicative of a storage performance metric for a user storage group;
      compare, by the processor, the first data indicative of the storage performance metric for the user storage group to at least one threshold value;
      determine, by the processor, and based on the comparison of the received first data indicative of the storage performance metric for the user storage group to the at least one threshold value, whether a data surge is occurring;
      when it is determined that the data surge is occurring:
         determine available performance capacity of the apparatus; and
         in response to determining that the available performance capacity is available, increase at least one storage performance metric of the user storage group;
      when the storage performance metric remains less than a first predetermined percentage of the at least one threshold value for at least a predetermined time duration, decreasing the at least one threshold value; and
      when the storage performance metric is greater than a second predetermined percentage of thresholds agreed to level, increasing the at least one threshold value.

12. The apparatus of claim 11, wherein the memory stores additional computer-executable instructions that, when executed by the processor, cause the apparatus to:
   determine if the first data is being executed by a Tier 0 or Tier 1 application; and
   in response to the determination that the available performance capacity is available and the first data is being executed by the Tier 0 or Tier 1 application, increase the at least one storage performance metric of the user storage group.

13. The apparatus of claim 12, wherein the memory stores additional computer-executable instructions that, when executed by the processor, cause the apparatus to:
   determine if the first data is being executed during business hours; and
   in response to the determination that the available performance capacity is available and the first data is being executed during business hours by the Tier 0 or Tier 1 application, increase the at least one storage performance metric of the user storage group.

14. The apparatus of claim 12, wherein the memory stores additional computer-executable instructions that, when executed by the processor, cause the apparatus to:
   determine a health status of computer platform components; and in response to the determination that the available performance capacity is available and the computer platform components are healthy, and the first data is being executed during business hours by the Tier 0 or Tier 1 application, increase the at least one storage performance metric of the user storage group.

15. The apparatus of claim 11, wherein the memory stores additional computer-executable instructions that, when executed by the processor, cause the apparatus to:
generate a notification that the data surge is occurring.

16. The apparatus of claim 11, wherein the at least one storage performance metric of the user storage group includes an IOPS limit.

17. The apparatus of claim 11, wherein the at least one storage performance metric of the user storage group includes a throughput limit.

18. The apparatus of claim 11, wherein the at least one storage performance metric of the user storage group includes both an IOPS limit and a throughput limit.

19. One or more non-transitory computer-readable medium having instructions stored thereon that, when executed by one or more computing devices, cause the one or more computing devices to:
receive first data indicative of a storage performance metric for a user storage group;
compare the first data indicative of the storage performance metric for the user storage group to at least one threshold value;
determine based on the comparison of the received first data indicative of the storage performance metric for the user storage group to the at least one threshold value, whether a data surge is occurring;
when it is determined that the data surge is occurring:
determine available performance capacity of the one or more computing devices; and
in response to determining that the available performance capacity is available, increase at least one storage performance metric of the user storage group;
when the storage performance metric remains less than a first predetermined percentage of the at least one threshold value for at least a predetermined time duration, decrease the at least one threshold value; and
when the storage performance metric is greater than a second predetermined percentage of thresholds agreed to level, increase the at least one threshold value.

20. The one or more non-transitory computer-readable medium of claim 19, having computer-readable instructions stored thereon that, when executed by the one or more computing devices, cause the one or more computing devices to:
determine if the first data is being executed by a Tier 0 or Tier 1 application; and
in response to the determination that the available performance capacity is available and the first data is being executed by the Tier 0 or Tier 1 application, increase the at least one storage performance metric of the user storage group.

21. The method of claim 1 further comprising:
removing a user from surge management services when the user is a persistent top user of surge management services without changes in service level agreements.

22. The method of claim 1 further comprising:
performing, before the receiving, at least one pre-check to ascertain an integrity of at least one storage device; and
when the integrity is not ascertained, preventing the receiving, the comparing, and the determining.

23. The method of claim 1, changing a tier level of an application for a user service group in accordance with a time criterion.

24. The method of claim 13, further comprising:
adjusting, in response to the changing of the tier level, the at least one threshold value.

* * * * *